United States Patent
Cliff et al.

(10) Patent No.: US 8,042,050 B2
(45) Date of Patent: Oct. 18, 2011

(54) METHOD AND APPARATUS FOR INTERACTIVE BROADCASTING

(75) Inventors: David Trevor Cliff, Bristol (GB); Colin Andrew Low, Gloucestershire (GB); Rycharde Jeffery Hawkes, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 870 days.

(21) Appl. No.: 10/202,730

(22) Filed: Jul. 24, 2002

(65) Prior Publication Data
US 2003/0025722 A1 Feb. 6, 2003

(30) Foreign Application Priority Data
Jul. 31, 2001 (GB) .................................. 0118594.1

(51) Int. Cl.
*G09G 5/00* (2006.01)
(52) U.S. Cl. .......................... 715/757; 715/706
(58) Field of Classification Search .................. 715/751, 715/753, 756–759, 719–720, 722–726, 744–747, 715/748–749, 706, 709, 715; 725/37; 463/21, 463/30–32, 40, 42
See application file for complete search history.

(56) References Cited

U.S. PATENT DOCUMENTS

| | | | |
|---|---|---|---|
| 4,305,131 A | 12/1981 | Best | |
| 5,682,511 A * | 10/1997 | Sposato et al. | 715/716 |
| 6,106,399 A | 8/2000 | Baker et al. | |
| 6,138,128 A * | 10/2000 | Perkowitz et al. | 715/205 |
| 6,377,263 B1 * | 4/2002 | Falacara et al. | 345/473 |
| 6,433,795 B1 * | 8/2002 | MacNaughton et al. | 715/738 |
| 6,447,396 B1 * | 9/2002 | Galyean et al. | 463/40 |
| 6,519,771 B1 * | 2/2003 | Zenith | 725/32 |
| 6,756,997 B1 * | 6/2004 | Ward et al. | 715/716 |
| 6,783,460 B2 * | 8/2004 | Galyean et al. | 463/40 |
| 6,810,528 B1 * | 10/2004 | Chatani | 725/109 |
| 6,813,775 B1 * | 11/2004 | Finseth et al. | 725/46 |
| 6,924,803 B1 * | 8/2005 | Girling et al. | 345/473 |
| 6,947,966 B1 * | 9/2005 | Oko et al. | 709/203 |
| 2002/0052919 A1 * | 5/2002 | Morris et al. | 709/205 |
| 2002/0054080 A1 * | 5/2002 | Belanger et al. | 345/738 |
| 2002/0055880 A1 * | 5/2002 | Unold et al. | 705/26 |
| 2002/0067372 A1 * | 6/2002 | Friedrich et al. | 345/753 |
| 2002/0090985 A1 * | 7/2002 | Tochner et al. | 463/1 |
| 2002/0152114 A1 * | 10/2002 | Shumaker et al. | 705/12 |
| 2003/0013526 A1 * | 1/2003 | Galyean et al. | 463/40 |
| 2003/0014746 A1 * | 1/2003 | Giroux | 725/14 |
| 2003/0066872 A1 * | 4/2003 | McClure et al. | 235/51 |
| 2003/0236908 A1 * | 12/2003 | Khang | 709/231 |
| 2004/0174431 A1 * | 9/2004 | Stienstra | 348/155 |
| 2005/0005244 A1 * | 1/2005 | Chesley et al. | 715/751 |
| 2005/0028207 A1 * | 2/2005 | Finseth et al. | 725/46 |
| 2007/0083423 A1 * | 4/2007 | Delbridge | 705/12 |

FOREIGN PATENT DOCUMENTS

GB 2355627 A 4/2001

(Continued)

*Primary Examiner* — Steven Sax (57) ABSTRACT

A method of creating an interactive broadcast, comprising allowing a plurality of participants to vote on an aspect of a scenario in a virtual space, the broadcast being a computer-generated animated scenario comprising graphics and audio, the participants voting by means of user interface devices which are linked over a communications network to a server, the server being operative to process the received votes and determine how the broadcast should be collectively influenced in view of the votes received, and then generate the broadcast.

13 Claims, 3 Drawing Sheets

FOREIGN PATENT DOCUMENTS

| | | |
|---|---|---|
| GB | 2355627 | 11/2001 |
| JP | 2002300564 A * | 10/2002 |
| WO | WO-97/12350 | 4/1997 |
| WO | WO97/12350 | 4/1997 |
| WO | WO-98/21682 | 5/1998 |
| WO | WO98/21682 | 5/1998 |
| WO | WO-02/05904 | 1/2002 |
| WO | WO 02/05904 A | 1/2002 |

* cited by examiner

METHOD AND APPARATUS FOR INTERACTIVE BROADCASTING

FIELD OF THE INVENTION

The present invention relates to a method and apparatus for interactive broadcasting and in particular to a method and apparatus for producing a broadcast of a scenario in a virtual space, the broadcast scenario being influenced by a plurality of participants.

BACKGROUND

Interactive broadcasting has of recent times found high popularity. This is undoubtedly due to the ability of such broadcasting to provided heightened enjoyment through the viewers having a sense of involvement. In a known 'virtual cartoon' series (The Smithsons produced by Illumina for the TV channel Sky TV in the UK), participant viewers are able to e-mail or post suggestions to the cartoon producer. The producer, a real person, would then determine which content suggestions were to be incorporated into a particular week's episode. For example the suggestions may include plot developments, phrases to be spoken by the cartoon characters, and even for graffiti which would appear in the cartoon environment. A disadvantage of such a production is that a high human input is required to select and incorporate the suggestions.

In a known television series (e.g. "Big Brother", a UK TV show) a group of people live together in a house and their day-to-day life in the house as they interact with others is watched by viewers using an array of cameras and microphones. Those viewing the series over the Internet are able to vote in support of or against the interests of the people in the house: whether a particular person should be evicted from the house. Automated telephone voting is also possible, as is Internet voting. The viewers are telecommunications/web participants. One costly aspect of such a series is the need to provide food and shelter for the human 'residents' of the house. Another is the cost of the production crew: there may be more than a hundred people (e.g. 300) employed to produce the show. The interactivity of the viewer-participants is limited to voting who they want to see evicted next.

In both of the examples given, humans are heavily involved in implementing the viewer-participant selected wishes (and in the case of "Big Brother" the characters are humans and there is no viewer-participation in what they do).

SUMMARY OF THE INVENTION

According to a first aspect of the invention there is provided a method of producing a broadcast of a scenario in a virtual space comprising accepting signals representing preferences of a plurality of participants, the preferences being associated with an aspect of the scenario, processing the signals representing the preferences in order to determine how the scenario should be influenced in view of the preferences of the participants.

Advantageously a plurality of participants may influence an aspect of the broadcast of a scenario in a virtual space by voting which, in one preferred embodiment, is a computer generated animated broadcast in which the participants submit votes over a communications network to a production-controlling computer. The participants may then view the broadcast which they have influenced. Multiplexing the preferences of many participants enables those participants to influence a particular aspect of the broadcasted scenario, such as for example the characteristics of a computer generated virtual character. Those participants who can influence an aspect may then feel part of a team or group, which may promote a sense of well-being.

The method desirably comprises collating the preferences received.

The received preferences are preferably collated in accordance with a protocol, the protocol determining a preference which should be adopted in view of the preferences received.

The protocol preferably comprises counting the preferences received and determining which of a plurality of preference options should be incorporated into the broadcast.

The protocol may comprise calculating an average of respective values assigned to each of a plurality of preference options.

Preferably the broadcasted scenario is generated by a computer.

The term 'computer' shall herein be taken to mean any device or collection of devices which accepts an input, processes that input in accordance with predefined rules and produces an output.

Preferably the computer is provided with instructions, the computer controlling the evolution of the broadcasted scenario in accordance with the instructions.

Preferably a signal representing a determined preference is transmitted to a computer which incorporates the determined preference into broadcasted scenario.

At least part of the broadcasted scenario may be generated by a computer, in accordance with pre-determined stored data. Most preferably, a substantial part of the broadcasted scenario is generated in accordance with predetermined stored data.

In a preferred embodiment the stored data comprises instructions for generating the necessary graphics and audio for the broadcast and rules relating to how participants may interact, what aspects can be influenced and rules as to how to process the preferences received so as to determine how the broadcast should be influenced.

The method may be a method of producing a broadcast of a computer generated animated scenario.

According to a second aspect of the invention there is provided a computer readable medium having stored therein instructions for causing a data processor to execute the method in accordance with the first aspect of the invention.

According to a third aspect of the invention there is provided a computer-readable medium having stored therein instructions to process signals representing preferences of participants, the preferences relating to an aspect of a broadcast of a scenario in a virtual space, the instructions comprising rules which determine a preference output which represents how the broadcast should be influenced in view of the preferences received.

According to a fourth aspect of the invention there is provided a method of producing a broadcast of a scenario in a virtual space comprising accepting an input of a participant, the input representing a preference of the participant relating to an aspect of the scenario, transmitting a signal representing the input across a communications network to a computer, the computer being configured to process the signal and other signals representing the preferences of other participants so as to determine how the scenario should be influenced.

The participants may thus vote on an aspect of the scenario to be broadcast via the Internet, for example. The broadcast may be broadcast also via the Internet.

Preferably a participant is presented with a plurality of preference options relating to an aspect of the scenario at least one of which he can select as a preference.

The participant may be permitted to select a plurality of the preference options presented to him.

Preferably the participant can assign respective of degrees of priority to the selected preference options.

The method may comprise transmitting signals representing preferences from user interface devices which are remote of the computer.

The signals representing preferences may be permitted to be received by the computer within a predetermined period.

According to a fifth aspect of the invention there is provided a computer-readable medium having stored therein instructions for causing a data processor to execute the method in accordance with the first aspect of the invention.

According to a sixth aspect of the invention there is provided a computer-readable medium having stored therein instructions to permit a participant to input data representing a preference relating to an aspect of a broadcast of a scenario in a virtual space and transmit a signal representing the input data to a computer over a communications network.

According to a seventh aspect of the invention there is provided a method of producing a broadcast of a scenario in a virtual space, the method comprising transmitting signals representing preferences of a plurality of participants to a production-controlling computer arrangement over a communications network, the preferences being associated with an aspect of the scenario, and processing the signals representing the preferences in order to determine how the scenario should be influenced in view of the preferences of the participants.

Preferably a first group of participants is permitted to influence a first respective aspect and a second group of participants are permitted to influence a second respective aspect. Both groups may be able to influence a single particular aspect.

According to an eighth aspect of the invention there is provided a program storage device readable by a machine and encoding a program of instructions for executing the method in accordance with the fifth aspect of the invention.

According to a ninth aspect of the invention there is provided apparatus for producing a broadcast of a scenario in a virtual space, the apparatus comprising a computer, the computer being configured to receive and process signals representing preferences from a plurality of participants, the signals being received over a communications network, the preferences being associated with an aspect of the scenario and the computer being programmed to determine how the scenario should be influenced in view of the preferences of the participants.

Preferably the computer is configured to process signals representing at least one of a plurality of preference options relating to an aspect of the scenario which a participant has selected.

The computer may be configured to process signals representing a plurality of preference options relating to an aspect of the scenario which a participant has selected.

The computer may be configured to process signals representing preferences to which respective degrees of priority have been assigned.

The computer desirably configured to collate the received preference options.

The computer is desirably configured to collate the received preference options in accordance with a protocol, the protocol determining a preference option which should be adopted in the scenario.

The computer is preferably configured to incorporate a determined preference into the broadcasted scenario.

The computer is preferably provided with a data storage device, the broadcasted scenario being generated at least in part in accordance with data stored on the storage device.

Preferably the computer is provided with instructions, the computer controlling the evolution of the broadcasted scenario in accordance with the instructions.

The data may relate to the generation of graphics and/or audio which is included in the broadcasted scenario.

The computer preferably comprises a communications network connection which is adapted to be connected to viewer input devices.

The broadcast is desirably a computer generated broadcast.

According to a tenth aspect of the invention there is provided a network comprising a server, a broadcaster, participant input devices and receiver device, the arrangement being such that the participants input a preference relating to an aspect of a broadcast of a scenario in a virtual space into the participant input devices, the participant input devices transmit signals representing the preferences over a communications network to the server, the server processes the signals in order to determine a preference which should be incorporated into the broadcasted scenario, a signal representing the determined preference is transmitted to the broadcaster and the broadcaster broadcasts the scenario which incorporates the determined preference, the scenario being receivable by the receiver devices.

According to an eleventh aspect of the invention there is provided a method of operating a server comprising accepting signals representing preferences from a plurality of participants, the preferences relating to an aspect of a broadcast of a scenario in a virtual space, processing the signals to determine how the scenario should be influenced in view of the signals received, generating an output signal representing the broadcast of the scenario which incorporates the determined preference, the output signal being generated in accordance with a set of instructions.

According to a twelfth aspect of the invention there is provided a method of creating an interactive performance from a viewer-influenced character comprising:

providing production-controlling computer which produces a virtual computer-created character having at least one associated parameter which influences an observable characteristic of the character;

having multiple viewer-participants who are able to view the performance of the character and providing to the viewer-participants a preference-indicator to enable them to input to the production-controlling computer their selected preference for a parameter or characteristic;

having the production-controlling computer collate the selected preferences for the parameter or characteristic from the viewer participants and generate a collectively influenced operative parameter or characteristic and setting the parameter or characteristic of the character to the collectively influenced value or setting;

having the character perform in a virtual computer-generated environment with its associated parameter or characteristic set at the collectively influenced setting, and having the character acting within its environment in accordance with a set of behavioural rules, the performance being dependent upon the collectively influenced operative parameter or characteristic.

Thus, more than one person can "own" a character. Indeed, many people may identify with a single character because they feel that they have influenced its behaviour (have some control over it) by contributing to the communal setting of a parameter which controls it.

It will be appreciated that by "viewer" we primarily mean that the performance given by the character is a visual performance, most preferably an audio-visual performance, but we do not wish to exclude audio-only performances, and "viewer" should be interpreted as "viewer and/or listener".

Furthermore, whilst by "character" we do mean a representation of a recognisable noun, typically something which has a persona (e.g. a human character, an animal character, a living thing, an anthropomorphic entity), we also mean a representation of an inanimate object which nevertheless has a characteristic which can be influenced so as to influence the "viewed" performance. For example a table may have a strength characteristic selectable between "break when sat on" or "do not break". Whether or not the virtual table breaks when a virtual character sits on it can be determined by setting the parameter/characteristic of the table, which itself is a character in the performance of "man sits on table" scenario. Similarly, "characteristic" may simply be the colour or size of a character/object.

The main area of interest is in broadcast performances, such as by television or webcast telecommunications. The performance is preferably broadcast to remote viewer-participants who are remote from the production-controlling computer, and the preference indicators are preferably remote from the production-controlling computer but linkable to it via telecommunications.

The broadcast may be a wireless broadcast, or a cable broadcast, or an internet/www broadcast.

There may be a parameter or characteristic setting phase in the production of the performance by the production-controlling computer. There may be a performance output phase during which the performance is delivered to the viewer-participants. It may be possible to influence the parameter or characteristic during the output delivery of a performance, thereby influencing the character as the performance proceeds, possibly in real time. Alternatively, it may not be possible to influence at least a section of the performance after a shut-off point. For example, in performances where viewer-participants set characteristics of a competitor character which is to perform in a competition it may be desirable to allow the character to perform as the viewer-participants have set it up for a period before allowing them to alter it. There may be a series of character set-up/modification phases followed by performance delivery phases in an overall performance created by the performance-control computer.

The production-controlling computer may produce a plurality of virtual computer-generated characters which exist in the same virtual scene.

The computer may generate at least one main character, and some of the characters may comprise secondary environmental characters (possibly considered as objects), the main character existing in a virtual world comprised of the secondary environmental characters (possibly object characters).

Some, or all, of the environmental characters may not have any viewer-participant settable characteristics or parameters: they may be entirely computer-driven. For example, in a scenario of a virtual human character existing in a virtual room the human character may have parameters or characteristics settable collectively by a group of viewer-participants, but the virtual carpet, furniture, or other inanimate objects, in the room, and the walls, floor, ceiling, may have no viewer-participant modifiable characteristics.

A single character may have a plurality of characteristics settable/controllable by the viewer-participants. All participants may be able to influence all characteristics (or associated parameters) or some or all participants may be able to influence less than all characteristics. In one embodiment a first group of viewer-participants are able to influence a first group of characteristics of a character, and a second group of viewer-participants are able to influence a second group of characteristics of the character. The members of the first group of viewer-participants may not contain any members of the second group. The characteristics of the first group of characteristics may not contain any characteristics of the second group of characteristics.

Alternatively or additionally a first group of viewer-participants may be able to influence the characteristics of a first character, or first group of characters, and a second group of viewer-participants may be able to influence the characteristics of a second group of characters. The first group of characters may contain no characters of the second group. The first group of viewer-participants may contain no viewer-participants of the second group.

The viewer-participants may be able to self-select which character(s) or characteristic(s) they choose to influence. Alternatively, or additionally, the choice of character(s) and/or characteristic(s) that a viewer-participant may influence may be determined for them, possibly by the production-controlling computer.

Preferably one or more characters present in a computer-produced performance has an associated set of rules controlling its contribution to the performance and the performance-controlling computer, the rules operating on the character(s) to produce an outcome performance of the character that is dependent upon the interaction of the rules with the viewer-participant set operative parameter(s) or characteristic(s) of the character.

It will be appreciated that in the preferred embodiments the production-controlling computer automatically establishes the operative parameter(s) or characteristic(s) upon analysing the viewer-participants input selected preferences for the parameter(s) or characteristic(s).

In many preferred embodiments the computer will generate a shared virtual space inhabited by multiple virtual characters.

The parameter or characteristic that is modifiable by the viewer-participants may be an action or behaviour of a character (what it does), or its appearance (how it looks).

The computer may present the viewer-participant with a choice of allowable options (e.g. a menu) of parameters or characteristics, and the viewer-participant may select from the available choice presented to them. The choice may be a binary decision, or selecting one from a list, or a grey-scale value input/selected by the viewer-participant.

The available choices present for the setting of a parameter or characteristic may be stored in a memory of the computer, or they may be generated dynamically.

Thus the performance controlling computer has a framework of actions or future events to be played out by the character during the performance, and within that framework the actual output performance is determined by the operative characteristics or parameters of the character(s) in the performance, which are collectively set by the viewer-participants.

In this way, complex and sophisticated interactions between characters (e.g. pseudo-living/moving characters and other pseudo living/moving characters) can be programmed into the production control computer and relatively few adjustable character parameters or characteristics can have a significant influence upon the performance output by the computer. This can reduce the bandwidth requirement for viewer-participant control of the characters.

DESCRIPTION OF PREFERRED EMBODIMENTS

Various preferred embodiments of the invention will now be described, by way of example only, with reference to the accompanying drawings, in which.

Figure 1:
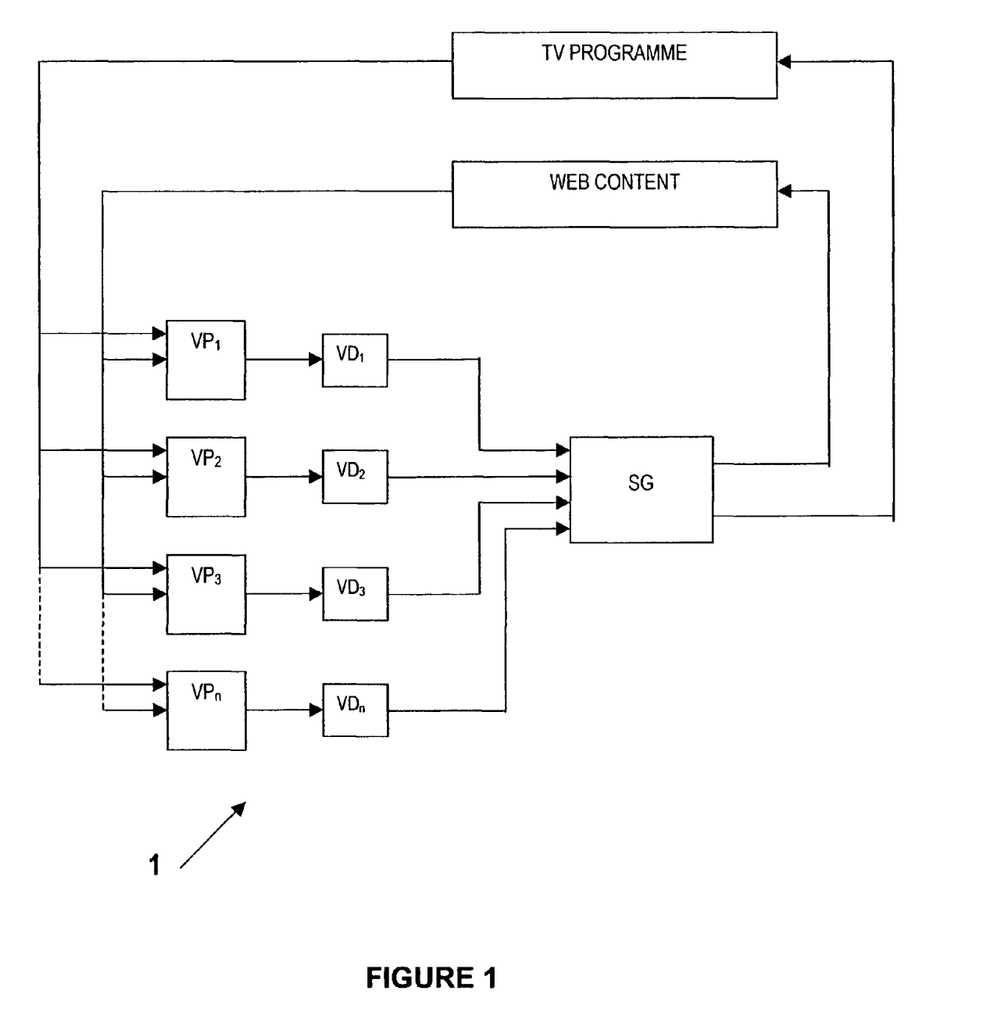
FIG. 1 is a block diagram representation of an interactive broadcasting apparatus.

With reference to FIG. 1 there is shown an interactive broadcasting apparatus 1 which enables a plurality of viewer participants $VP_1$, $VP_2$, $VP_3$ and $VP_n$ to influence an animated scenario in a virtual space. The apparatus 1 comprises a plurality of voting devices $VD_1$, $VD_2$, $VD_3$ and $VD_n$ and a production-controlling computer comprising a scenario generator server SG.

Each participant has access to a respective voting device $VD_1$, $VD_2$, $VD_3$ and $VD_n$. The voting devices comprise a conventional computer terminal in the form of a personal computer, the personal computer comprising a data processor, a memory, input means, output means and a communications network connection. It will be appreciated however that existing interactive digital television technology could be adapted to provide the function of a voting device, as could a mobile telephone.

Each voting device $VD_n$ is provided with a network connection to the remotely located scenario generator SG. The scenario generator server comprises a data processor and a memory.

In brief the apparatus 1 operates by allowing each viewer participant $VP_n$ to influence at least one aspect of an animated scenario comprising graphics and/or (preferably and) sound, in a virtual space generated by the scenario generator SG. The participant-influenced scenario is then broadcast via the Internet and/or by television so that the scenario may be viewed by the viewer participants. Although the invention is principally described here with reference to animated scenarios ie comprising computer-generated graphics, the invention also finds application in other scenarios, for example those which only comprise an audio element which could be broadcast on radio and/or via the Internet, for example.

The types of scenario which the viewer participants $VP_n$ may influence are wide ranging. For example the scenario could be a sports scenario in which one or more virtual players compete against one or more other virtual players. Alternatively the scenario may comprise a plurality of virtual characters which exist in a virtual environment and which interact with one another, for example a virtual 'soap opera'. Yet another example of a possible scenario is a competition between two virtual entities, for example a virtual 'dog-fight' between two virtual aircraft. It is envisaged that a scenario will comprise at least one identifiable virtual entity whether, human, animal or otherwise.

As previously mentioned, the apparatus 1 allows viewer participants to collectively influence an aspect of a scenario by voting. There are many aspects which could be subject to the voting of view participants. For example, number, type, behaviour, appearance, characteristics of characters, players or whatever entities are involved in the scenario. Other aspects which viewer participants may influence could include type, size, shape and other characteristics of the virtual space in which the entities exist, for example, weather conditions, amount of food, degree of danger.

Yet a further aspect of a scenario which viewer participants could influence may include story lines or plot development, for example the fate of a particular character.

Since it would be unattractive and largely impractical for viewer participants to have a vote on all aspects of a scenario and provide all of the input, the scenario generator server SG is therefore provided with stored data and possibly artificial intelligence, the broadcasted scenario being generated at least in part in accordance with the stored data and/or artificial intelligence. The artificial intelligence may for example comprise artificial neural network software to generate behaviours of virtual characters. The stored data comprises predetermined instructions for generation of the animated scenario, ie graphics data and audio data. In particular there will be some aspects of the scenario which viewers will not be able to influence for which there will be provided corresponding stored data, for example the actions, movement, dialogue etc of an entity which is not under participant influence. The stored data and/or artificial intelligence influences the evolution of an animated scenario incorporating one or more elected preferences. The stored data and/or the artificial intelligence ideally provides a degree of perceived unpredictability to the evolution of the scenario so as to enhance the interest generated by the broadcast.

As mentioned the broadcast may be generated by using computer graphics techniques to produce moving picture renderings (video, possibly with associated audio signals) illustrating the actions and interactions of a number of virtual characters. The virtual characters may have associated control software that senses or reads the virtual environment surrounding the characters and the software uses that environment to determine an appropriate action to execute, possibly from a finite list of actions or possibly from a continuously variable space of possible actions. This control software may follow pre-programmed scripts or may, as previously discussed, involve artificial intelligence techniques to make the character independent or autonomous.

In use the apparatus 1 operates as follows. Each viewer participant $VP_n$ is each presented on the screen of their respective personal computers a graphical user interface (GUI) which is transmitted from the scenario generator server SG via the Internet. The GUI presents the viewer participants with a plurality of preference options by way of a set of discrete options, a continuous range of options (for example the personality of a virtual character may be influenced by a numerical scale from '1' passive to '5' very aggressive) or a binary option (for example the viewer participants are required to select 'YES' or 'NO' in response to a question posed). The GUI may alternatively or in addition provide the viewer participants with an opportunity to submit suggestions for aspects of a scenario which could be subject of a vote. The scenario generator server SG could then collect all the suggestions and transmit them to all the other viewer participants incorporated into a GUI in a form suitable to be voted on.

The viewer participants have a predetermined time in which to vote. During the course of the broadcast of the influenced scenario the viewer-participants may be given one or more further opportunities to vote on aspects of the scenario.

Once the initial time limit for voting has elapsed the server SG processes the data received from the viewer participants. The server SG counts the votes received using, for example a queuing system on receiving the signals and then processes the signals to determine which preference should influence the scenario. For example, if the viewer participants were offered a plurality of discrete preference options to determine the 'winning' preference as that which received the most votes. Alternatively the viewer participants may be able to select, say, three preference options from a plurality of preference options in order of priority or weighting. The server SG would then need to count the votes of the participants taking account of the various weightings attributed. The server SG may be configured to count the votes in a 'first past the post' system whereby as counting is taking place the first preference option which exceeds a predetermined value is determined to be the 'winning' preference. Where viewer participants may select values from a continuous range of options relating to an aspect of the scenario the server SG may be operative to take an average of the preference values submitted. The average could be a mean, a mode or a median.

It will be appreciated that the GUI may allow the viewer participants to vote on a plurality of aspects.

Once the scenario generator server SG has determined which preference(s) should be adopted in the scenario, it then proceeds to generate the animated scenario incorporating the one or more determined preferences and broadcast said scenario by streams of data. The broadcast can then be viewed on television or as a webcast on the Internet.

Figure 2:
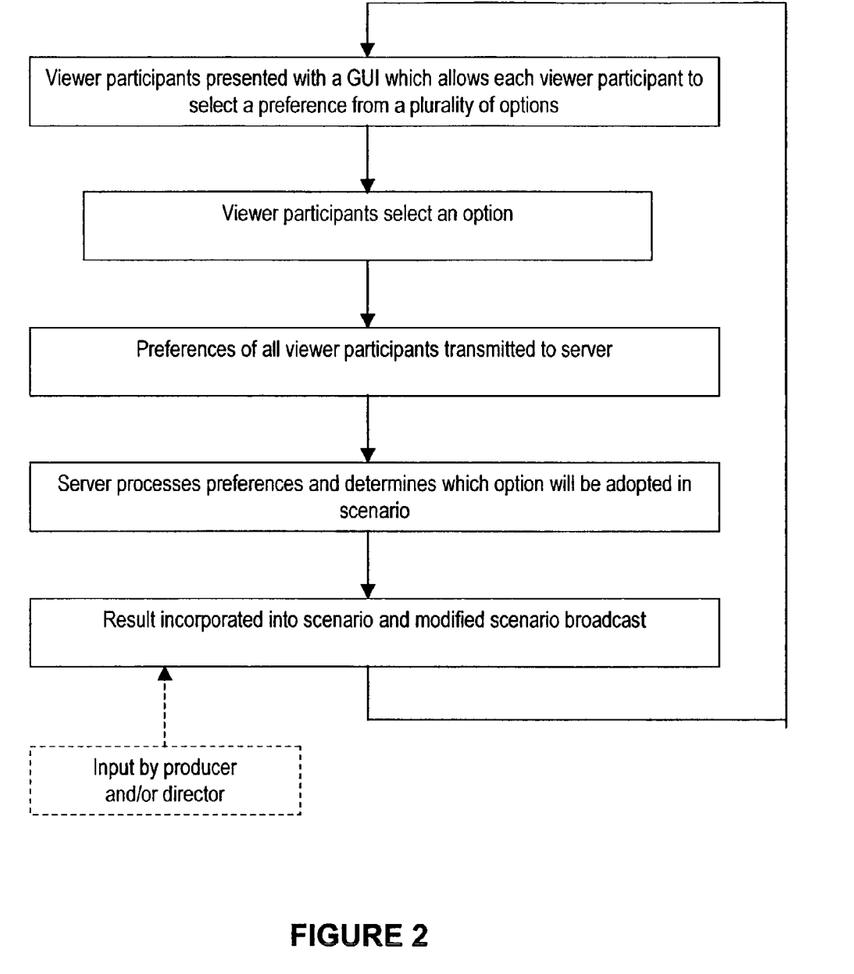
FIG. 2 is a flow diagram of steps of a process of influencing a scenario in a virtual space for interactive broadcasting.

FIG. 2 shows schematically how an animated scenario in a virtual space is generated by the arrangement of FIG. 1 in which the GUI presents the viewer participants with a plurality of discrete preference options. Human input in the production of the broadcast is possible but is preferably kept to a minimum, and is most preferably fully produced by the scenario generator SG once the votes have been processed.

By way of example one could envisage, amongst many others, the following possible interactive animated scenarios. A virtual football or soccer match in which viewer participants may vote on one or more of the following:
which formation a team should adopt,
which players should make the team up,
who should be brought on as substitute during a match,
whether a particular player should be predominantly left footed or right footed.

As another possibility viewer participants may vote on various aspects of a virtual horse race. For example viewers may vote on the characteristics of a particular virtual horse such as height, age, build, or upon conditions of the course, length of race, or upon choice of jockey, experience of jockey, weight, etc.

A scenario may include a plurality of virtual 'creatures'. Viewer participants are presented with a library of such creatures each having a respective set of initial characteristics. The viewer participants may then vote on such things as which 'creatures' should replace other creatures in a virtual scenario, which creature or creatures should 'breed' with which other creatures to create combined characteristics and which creature or creatures should be chosen to undergo a simulated evolutionary process so that characteristics are developed. The viewer participants would eventually decide on a creature to be incorporated in the scenario in question.

Figure 3:
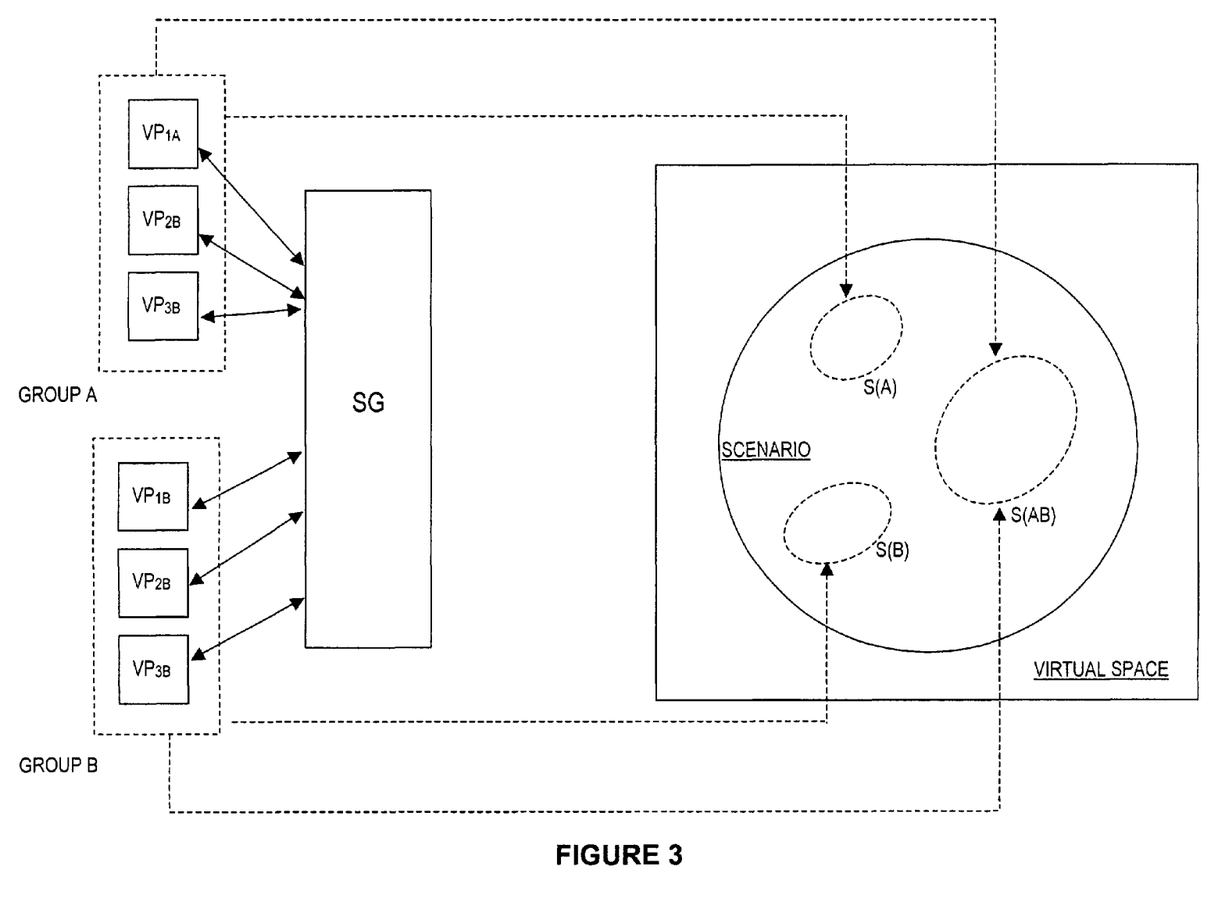
FIG. 3 is a schematic representation of an interactive broadcasting system showing which aspects of a scenario in a virtual space various participants may influence.

In many situations of interest the number of influencable aspects or parameters may be too large to usefully represent, in which case a system similar to the Biomorphs computer program introduced by Richard Dawkins in his 1986 book The Blind Watchmaker may be employed. In such a system a number of random "mutants" of the original list of parameter values is created, where for each parameter there is some probability that the mutant list will hold a different value from the original list. In cases where the mutant parameter value does differ, the new value may be arrived at by generating a value at random from some distribution (that possibly depends on the relevant parameter value in the original list) or alternatively by adding a fixed increment/decrement to the value. Some small number of such "mutant" parameter-lists are generated and the corresponding virtual characters are previewed or otherwise displayed to the viewer participants, who then choose one of the available mutants to replace the original version. This mutate-display-choose-replace cycle can be iterated through several successive repetitions, allowing the collective votes to guide a trajectory through a high-dimensional parameter space. FIG. 3 shows how the viewer participants may be divided into groups or constituencies. In this example two groups of viewer participants $VP_{1A}$, $VP_{2A}$, $VP_{3A}$ and $VP_{1B}$, $VP_{2B}$, $VP_{3B}$ make up two groups A and B respectively. Each group may vote on a respective particular set of aspects S(A) and S(B) of a scenario in a virtual space. For example group A may vote on aspects of a first virtual football team and group B may vote on aspects S(B) of a second virtual football team. Once the voting has taken place and been processed a virtual match between the first team and the second team can commence. There may be some aspects S(AB) which both groups can vote on, for example in the above example of a virtual football match whether in the event of a draw, extra time should be played in order to determine a winner. The membership of the groups could for example be decided by geographical location of the viewer participants, or by affiliation to a club or society.

By allowing particular groups of viewer participants to vote on aspects of particular virtual entities the sense of involvement and control experienced by the viewer participants is enhanced.

It will be appreciated that other architectural arrangements than that shown in FIG. 1 are possible. For example each group of viewer participants may have a respective group server and the group servers having a communications link to a central server, or connected on a peer-to-peer network.

As is now evident the invention may be thought of as a way of allowing a plurality of viewer participants (preferably a large number of viewer-participants, perhaps of the order of $10^6$), to express their preference(s) for a scenario in a virtual space by voting on one or more aspects of the scenario (e.g. by multiplying votes). The preferences can be expressed as a low-bandwidth signal where one user requires a bandwidth of between 10 bits to 1000 bits, for example (for example voting for one of several discrete preference options might only require of the order of $10^1$ bits). As discussed above viewer participants may be able to vote only during predetermined periods, this results in intermittent low bandwidth signals. Advantageously such signals require reduced processing capacity than that which is necessary for games which are played by several hundred thousand players on-line simultaneously via the Internet in which each player may continuously control an associated one-to-one-individual entity or character. Furthermore the cost of providing intermittent telecommunication links is substantially less than that for being continuously linked to a server.

It will be appreciated that the invention may employ any suitable user interface device through which participants may vote. The user interface device may be connected to the server by a wireless, non-wireless telecommunications link. A mobile telecommunication device may be employed using the SMS text message facility to cast votes. Yet a further possibility is participants using a so-called laptop or palmtop computer to vote over the Internet. Another possibility would be to allow participants to vote using touch-tone telephones. Yet a further possibility for a user interface device would be a specially designed device provided with suitable input means, which a participant could simply plug into an existing telephone socket. Another possibility would be a specially configured television remote control handset.

A further advantage of the invention is that the scenario which is broadcast may require only minimal, if any, human intervention to process the preferences of the participants in order to produce the broadcast. This results in an important cost saving and potentially savings in the time needed to produce the broadcast once viewer participants have voted.

It will be appreciated that although the scenario generator server SG performs the functions of storing the GUI, processing the votes and producing and broadcasting the influenced scenario, those functions may be performed by two or more physical devices. For example one device may store the GUI and process the votes, linked to which there is provided another device which generates and broadcasts the scenario.

The invention claimed is:

1. A method of producing a broadcast of a multi-character game in which the characters are divided into teams, in a virtual space, the method comprising:
   accepting signals representing votes of a plurality of participants monitoring the broadcast, the votes being associated with an aspect of the multi-character game in the virtual space that is being broadcasted and subject to being influenced during the broadcast based on a collective evaluation of the signals accepted from tile plurality of participants, and processing the signals representing the votes so as to determine how the multi-character game in the virtual space should be influenced in view of the votes of the participants, wherein at least part of the broadcasted multi-character game is generated by a computer in accordance with predetermined stored data and wherein the multi-character game comprises a computer generated animated multi-character game, wherein the aspect of the multi-character game comprises an animated character in the computer animated generated multi-character game whose behavior is influenced by the preferences of the plurality of participants, and
   wherein the animated character acts in a manner that is determined from the processing of the signals representing the preferences,
   wherein the dynamic collective results of the votes determine a series of behavioral interactive sequences of the characters in real time within the game to affect progression of the game such that the game evolves favorably for different teams dynamically according to the votes.

2. A method as claimed in claim 1 in which the computer is provided with instructions, the computer controlling the evolution of the broadcasted scenario in accordance with the instructions.

3. A method as claimed in claim 1 in which a determined preference based on a number of votes received is incorporated into the broadcasted scenario by a computer.

4. A method as claimed in claim 1 in which a substantial part of the broadcasted scenario is generated in accordance with pre-determined stored data.

5. A computer-readable storage medium having stored therein instructions for causing a data processor to execute the method as claimed in claim 1.

6. A method as claimed in claim 1, wherein a primary character is not influenced by the votes of the plurality of participants.

7. A method as claimed in claim 1, wherein the plurality of participants influence the aspect of the scenario that is produced in the computer animated generated scenario and delivered to a viewer of the computer animated generated scenario.

8. A method as claimed in claim 7, wherein influencing of the aspect of the scenario occurs in real time.

9. A method as claimed in claim 1, wherein the virtual space is inhabited by multiple virtual characters.

10. A method as claimed in claim 1, wherein the aspect of the scenario comprises at least one environmental condition in the virtual space.

11. A method of producing a broadcast of a multi-character game in which the characters are divided into teams, in a virtual space, the method comprising:
    accepting signals representing votes of a plurality of participants monitoring the broadcast, the votes being associated with an aspect of tile multi-character game in the virtual space that is being broadcasted and subject to being influenced during the broadcast based on a collective evaluation of the signals accepted from the plurality of participants, collating the votes received in accordance with a protocol, the protocol determining a preference which should be adopted in view of the votes received and in which the protocol comprises counting the number of votes received and determining which of a plurality of preference options being voted on should be incorporated into the broadcast; and processing the signals representing the votes so as to determine how the multi-character game in the virtual space should be influenced in view of the votes of the participants wherein at least part of the broadcasted multi-character game is generated by a computer in accordance with predetermined stored data and wherein the multi-character game comprises a computer generated animated multi-character game, wherein the aspect of the multi-character game comprises an animated character in the computer animated generated multi-character game whose behavior is influenced by the preferences of the plurality of participants, wherein the dynamic collective results of the votes determine a series of behavioral interactive sequences of the characters in real time within the game to affect progression of the game such that the game evolves favorably for different teams dynamically according to the votes.

12. A method of producing a broadcast of a multi-character game in which the characters are divided into teams, in a virtual space, the method comprising:
    accepting signals representing votes of a plurality of participants monitoring the broadcast, the votes being associated with an aspect of the multi-character game in the virtual space that is being broadcasted and subject to being influenced during the broadcast based on a collective evaluation of the signals accepted from the plurality of participants, collating the votes received in accordance with a protocol, the protocol determining a preference which should be adopted in view of the votes received and in which the protocol comprises calculating an average of respective values assigned to each of a plurality of preference options being voted on which are received; and
    processing the signals representing the votes so as to determine how the multi-character game in the virtual space should be influenced in view of the votes of the participants, wherein at least part of the broadcasted multi-character game is generated by a computer in accordance with predetermined stored data and wherein the multi-character game comprises a computer generated animated multi-character game,
    wherein the aspect of the multi-character game comprises an animated character in the computer animated generated multi-character game whose behavior is influenced by the preferences of the plurality of participants, wherein the dynamic collective results of the votes determine a series of behavioral interactive sequences of the characters in real time within the game to affect progression of the game such that the game evolves favorably for different teams dynamically according to the votes.

13. A method of creating an interactive performance from viewer-influenced characters in a multi-character game in which the characters are divided into teams, comprising:

providing production-controlling computer which produces a virtual computer-created character having at least one associated parameter which influences an observable characteristic of the character;

having multiple viewer-participants who are able to view the performance of the character and providing to the viewer-participants a preference indicator to enable them to input to the production-controlling computer their selected preference for a parameter or characteristic;

having the production-controlling computer collate the selected preferences for the parameter or characteristic from the viewer participants and generate a collectively influenced operative parameter or characteristic and setting the parameter or characteristic of the character to the collectively influenced value or setting;

having the character perform in a virtual computer generated environment with its associated parameter or characteristic set at the collectively influenced setting, and having the character acting within its environment in accordance with a set of behavioural rules, the performance being dependent upon the collectively influenced operative parameter or characteristic, wherein the dynamic collective results of the preferences determine a series of behavioral interactive sequences of the characters in real time within the game to affect progression of the game such that the game evolves favorably for different teams dynamically according to the preferences.

* * * * *